United States Patent [19]

Lee et al.

[11] Patent Number: 4,693,682
[45] Date of Patent: Sep. 15, 1987

[54] TREATMENT OF SOLIDS IN FLUIDIZED BED BURNER

[75] Inventors: Bernard S. Lee, Lincolnwood; Paul B. Tarman, Elmhurst; Dharam V. Punwani, Bolingbrook, all of Ill.

[73] Assignee: Institute of Gas Technology, Chicago, Ill.

[21] Appl. No.: 862,325

[22] Filed: May 12, 1986

[51] Int. Cl.$^4$ .................. F27B 15/00; F23D 19/00
[52] U.S. Cl. ......................... 432/15; 432/58; 110/245; 431/170
[58] Field of Search ............... 110/245; 432/58, 14, 432/15; 431/170, 353

[56] References Cited

U.S. PATENT DOCUMENTS

| | | | |
|---|---|---|---|
| 3,417,978 | 12/1968 | Suzukawa et al. | 110/245 |
| 3,935,825 | 2/1976 | Matthews et al. | 110/165 R |
| 4,017,253 | 4/1977 | Wielang et al. | 110/245 |
| 4,102,277 | 7/1978 | Wall | 110/245 |
| 4,165,040 | 8/1979 | Beacham et al. | 431/170 |
| 4,229,289 | 10/1980 | Victor | 34/57 A |
| 4,265,615 | 5/1981 | Lohmann et al. | 431/353 |
| 4,308,806 | 1/1982 | Uemura et al. | 110/245 |
| 4,311,278 | 1/1982 | Sutton | 431/170 |
| 4,400,150 | 8/1983 | Smith et al. | 110/245 |
| 4,424,766 | 1/1984 | Boyle | 110/245 |
| 4,455,969 | 6/1984 | Barker | 110/245 |
| 4,493,636 | 1/1985 | Haldipun et al. | 431/170 |

Primary Examiner—Henry C. Yuen
Attorney, Agent, or Firm—Thomas W. Speckman

[57] ABSTRACT

A process for thermal treatment of solid particles in a fluidized bed wherein the solid particles by thermal treatment form a lighter weight fraction and a heavier weight fraction, relative to the total contents of the bed. The process is characterized by use of a selective heavier particle discharge conduit in the sloping bed support and maintenance of a discrete fluid fueled flame in close proximity to and above the opening to the heavier particle discharge conduit. This forms a higher temperature zone in and surrounding the flame, at least about 100° F. higher than the remainder bed temperature. Circulation of solid particles through the flame and its surrounding higher temperature region is promoted both by directing of fluidization gas jets in the fluidized bed support and by the jetting action of the upwardly flowing heavier particle discharge gas.

15 Claims, 2 Drawing Figures

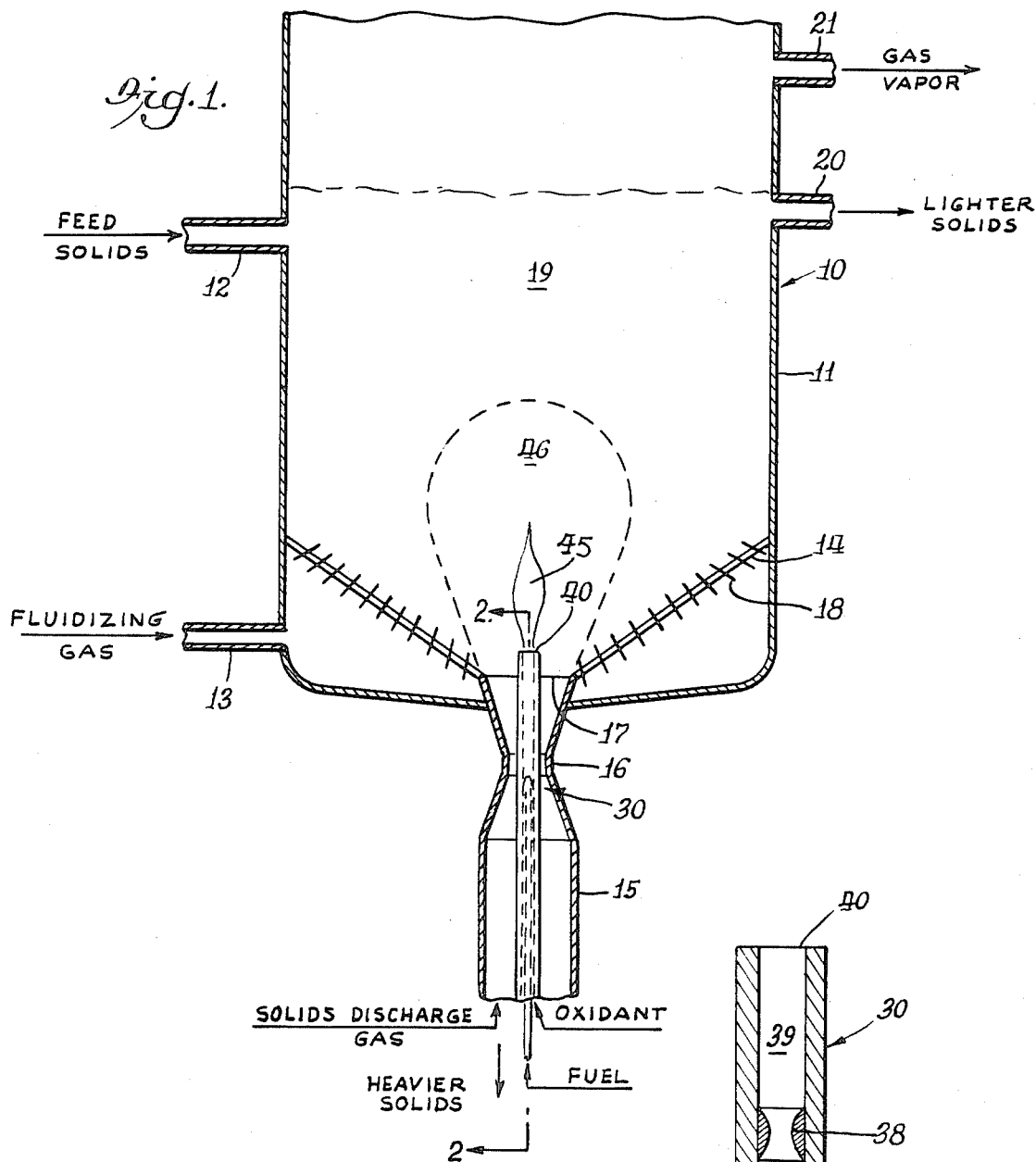

TREATMENT OF SOLIDS IN FLUIDIZED BED BURNER

BACKGROUND OF THE INVENTION

1. Field of the Invention

This invention relates to a process for thermal treatment of solid particles in a fluidized bed characterized by thermal treatment in multiple temperature zones forming a lighter weight fraction of solids or a gas or vapor and a heavier weight fraction of solids, relative to the average weight of contents in the bed. The solids are fed to a fluidized bed supported on a bed support having at least one region of opposing downwardly sloping portions which converge in their lower portions into the opening of a heavier particle discharge conduit. A discrete fluid fuel fed flame is maintained in the localized region above the heavier particle discharge conduit opening. The process of this inventio provides for treatment of solid particles at multiple temperatures within single fluidized bed and aids in the separation and withdrawal of solids of differing size-density relationships resulting from such thermal treatment. The process is particularly useful in incineration, calcining, solid particle reclamation, and metallic ore separation.

2. Description of the Prior Art

Fluidized beds are used in a large number of chemical processes and in the gasification or liquefaction of various solids such as coal and shale. Sloping bed supports have previously been used in the ash agglomerating fluidized bed apparatus and processes, such as taught by U.S. Pat. Nos. 4,229,289; 3,935,825; and 2,906,608.

Combustion of liquid fuel in a fluidized bed resting upon a sloping bed support wherein the fuel is injected from a central opening at the bottom of a conical support or in the sloping side regions is taught by U.S. Pat. No. 3,417,978. The '978 patent teaches that such a fluidized bed aids complete combustion of liquid fuel by atomization of the fuel for dispersal throughout the bed for burning. U.S. Pat. No. 4,284,401 teaches combustion of natural or manufactured gas in a fluidized bed and teaches control of fuel carrying air with air-fuel diffusion throughout the bed for combustion. These two patents emphasize the distribution of fuel throughout the fluidized bed for combustion.

Burner nozzles having central fuel supply tubes and annular oxidant supplies are exemplified by U.S. Pat. Nos. 3,972,690, 3,847,564; and 3,649,206.

Use of a carrier gas to sheath a stream of coating gas in a pyrolytic particle coating apparatus utilizing electric heat is taught by U.S. Pat. No. 4,153,004. U.S. Pat. No. 4,259,925 teaches a fluidized bed reactor having its total gas feed through a central tube with a plurality of ducts to effect laminar flow.

SUMMARY OF THE INVENTION

This invention relates to thermal treatment of solid particles in a fluidized bed, the fluidized bed having a discrete fluid fuel fed flame maintained in a localized region above a heavier particle discharge conduit opening. The solid particles are of a type which under thermal treatment with or without a reactant gas form a lighter weight fraction of solids or a gas or vapor and a heavier weight solids fraction, relative to the average weight of contents in the bed. By the terms "heavier weight fraction" and "lighter weight fraction" we mean to include all components in the bed whether they are in the gas, solid or liquid state. For example: in the case of non-combustible inorganic solids contaminated with organic materials being treated by the process of this invention, the vaporous and gaseous organics become the lighter weight fraction, while uncontaminated inorganic solids become the heavier weight fraction; and in the case of metal ore being treated by the process of this invention, the metallic components become the heavier weight fraction of solids and the reaminder of the ore components become the lighter weight fraction of solids. By the term "weight" we mean to include both the effects of density and particle size upon the mass of the particle.

The solids are fed, preferably, to the central portion of the height of a fluidized bed supported on a bed support having at least one region of opposing downwardly sloping portions which converge in their lower portions into the opening of a heavier particle discharge conduit, providing density/size particle classification for discharge. Gases and vapors may be withdrawn above the surface of the fluidized bed and lighter weight solid particles may be withdrawn from the upper portion of the fluidized bed itself. The discrete flame in the lower region of the fluidized bed according to the present invention provides a fluidized bed with a higher temperature zone including and surrounding the flame which is 100° to 400° F. or more higher than the lower temperature of the remainder of the fluidized bed. Fluidizing gas jets in the fluidized bed support may be directed to encourage solid particle movement to the higher temperature region of the fluidized bed surrounding the flame and through the flame itself. The jetting action of the solids discharge gas flowing up the heavier solids discharge conduit surrounding the gas and oxidant supply to the discrete flame further induces recycling of the heavier solid particles through the flame and produces smoother more uniform agglomerates or heavier solids for selective discharge.

It is, therefore, an object of this invention to provide for thermal treatment of solid particles in a fluidized bed wherein a discrete fluid fuel fed flame is maintained in a localized region above a heavier particle discharge conduit opening of the fluidized bed thereby providing a temperature zone including and surrounding the flame of at least 100° F. higher than the temperature of the remainder of the fluidized bed.

It is another object of this invention to provide a discrete flame in a fluidized bed for treatment of solid particles wherein the solids discharge gas provides a jetting action for enhanced recirculation of solids to the flame region and to produce more uniform and smoother surfaced agglomerates.

It is yet another object of this invention to provide a fluidized bed of solid particles having two different temperature zones wherein one thermally induced reaction may be carried out in a lower temperature zone and a different thermally induced reaction may be carried out in a higher temperature zone in the region of a discrete flame.

BRIEF DESCRIPTION OF THE DRAWING

The above and other objects, advantages and features of this invention will become apparent from the description together with the drawings wherein:

FIG. 1 is a stylized sectional view of one embodiment of an apparatus suitable for use in this invention; and FIG. 2 is an enlarged sectional view showing the burner along line 2—2 as shown in FIG. 1.

DESCRIPTION OF PREFERRED EMBODIMENTS

FIG. 1 shows fluidized bed reactor 10 having containment vessel 11 with fluidized bed 19 supported on sloping bed support 14. Fluidization of the solid particles is maintained by fluidizing gas provided through fluidizing gas inlet 13 and passing through fluidizing gas jets 18 in fluidized bed support 14. Fluidized beds providing selective discharge of solid particles heavier than the average of the solid particles in the fluidized bed are known to the art. Solids discharge is controlled by passing a solids discharge gas upwardly through heavier solids discharge conduit 15 which has a necked region 16 and an opening 17 providing access from a lower portion of fluidized bed 19. The flow rate of solids discharge gas upwardly through the heavier solids discharge conduit necked region 16 is adjusted to permit the desired heavier solid particles to fall by gravity against the countercurrent gas flow through necked region 16 into the lower portion of heavier solids discharge conduit 15 while pushing the lighter solids upwardly and recirculating them to the fluidized bed, thereby providing the desired classification of particles. Suitable apparatus and processes for achieving the desired solid particle classification are known to the art, such as those taught by U.S. Pat. Nos. 4,229,289; 3,935,825; and 2,906,608. Any of the fluidized bed apparatuses taught by these patents may be retrofitted or readily converted for use in the present invention. For use in the present invention, it is suitable for the sloping bed support to form angles to the horizontal of about 15° to about 75° and preferably about 30° to about 60°. Generally, velocities of solids discharge gas upwardly through heavier solids discharge conduit necked region are about 15 to about 60 feet per second, preferably about 20 to about 40 feet per second and velocities of fluidizing gas through fluidizing gas jets 18 are about 30 to about 100 feet per second, preferably about 40 to about 60 feet per second, providing a fluidizing gas velocity of about 1 to about 10 feet per second, dependent upon the density and particle size of the solids in the fluidized bed.

The fluidizing gas injected through fluidizing gas jets 18 and/or the solids discharge gas injected through heavier solids discharge conduit 15 may be a reactant gas which may react with solids in the fluidized bed or with the fuel, such as additional oxidant gas, or it may be an inert gas solely for the purpose of solids fluidization and control of heavier solids discharge. Air is frequently used as both fluidizing gas and solids discharge gas.

Prior fluidized beds have either used combustible solid particles or have been provided with combustible fuel generally throughout the fluidized bed to result in combustion throughout at least a large portion of the fluidized bed for generalized combustion and supply of desired reaction heat. Prior art fluidized beds have generally provided a relatively uniform temperature throughout the bed, or at least a gradual thermal gradient usually seeking to avoid differing temperature zones within the fluidized bed.

An important aspect of the present invention is maintenance of two discrete temperature zones within a fluidized bed and to provide a localized discrete flame 45 above opening 17 of heavier solids discharge conduit 15 forming a higher temperature zone in flame 45 and surrounding volume 46. This higher temperature zone is at least about 100° to about 400° F., and preferably about 200° to about 300° F., higher temperature than the remainder f the bed. Circulation of solids in the fluidized bed through and to the higher temperature region of flame 45 is increased by directing fluidizing gas jets 18 in such a manner as to direct particles in the fluidized bed toward flame 45. The solid particles may be passed through the higher temperature zone or through the flame itself several times for rapid heat up to higher temperatures. The jetting action of the upwards flowing solids discharge gas surrounding the flame aids in recirculation of solids through the higher temperature zone in and surrounding the flame facilitating more uniform reaction, such as more uniform size agglomerates.

The discrete flame 45 is maintained within the fluidized bed by use of burner 30 extending through the central portion of heavier solids discharge conduit 15 and having its outlet 40 a short distance above heavier solids discharge conduit opening 17. FIG. 2 shows burner 30 in greater detail having burner housing 35 in which fluid fuel jet 31 with fuel orifice 33 is mounted by supports 34 to form annular oxidant passage 36. Downstream from fluid fuel jet orifice 33 burner housing 35 forms primary fuel/oxidant mixing chamber 37. Mixing orifice 38 is located at the downstream end of primary fuel/oxidant mixing chamber 37 and leads into secondary fuel/oxidant mixture mixing chamber 39 which extends to burner outlet 40. The secondary mixing chamber, downstream from the mixing orifice, establishes a uniform turbulent flow in the mixture before it enters the flame zone. The end of the gas inlet tube and the entrance and exit of the mixing orifice must be of tapered design to reduce formation of standing wakes which could cause ignition of the mixture.

A discrete, stable flame may be maintained within the fluidized bed by any suitable means. The burner shown in FIG. 2 provides a discrete stable flame and may be operated with vaporized liquid or gaseous fuels as well known to the art. Any combustible fluid fuel may be used, such as vaporized fuel oil, natural gas, synthetic natural gas, medium Btu process gases, and other combustible gases. Natural gas is a typically preferred fuel. Suitable oxidants are well known to the art and include oxygen enriched gases and air. Thorough mixing of the fuel and oxidant is achieved by maintaining a ratio of fuel inlet velocity through fuel orifice 33 to the velocity of the oxidant introduced through annular oxidant passage 36 of about 5 to 10. Suitable fuel inlet velocities are in the order of about 100 to about 700 feet per second, preferably about 200 to about 500 feet per second, and suitable oxidant inlet velocities to primary fuel/oxidant mixing chamber 37 are about 20 to about 150 feet per second, preferably about 30 to about 100 feet per second. To enhance the fuel/oxidant mixing, mixing orifice 38 increases the velocity of the fuel/oxidant mixture leaving primary mixing chamber 37 to about 100 to about 500 feet per second, preferably about 150 to about 300 feet per second. The velocity through the mixing orifice is about 3 to about 10 and more times the velocity in the primary mixing chamber, preferably about 3 to about 8 times. The accelerated, mixed fuel/oxidant mixture then passes through secondary mixing chamber 39 and passes through burner outlet 40 at a velocity of about 50 to about 200 feet per second, preferably about 60 to about 100 feet per second. The physical size of the burner components may vary with desired burner capacity and will be apparent in view of the parameters set out in this disclosure. These burner velocities together with the fluidizing gas and the solids discharge gas velocities as disclosed above, permit a discrete stable flame attached to the burner outlet 40.

It is preferred to use both preheated fuel and preheated oxidant supplied to the burner. The fuel and oxidant may be preheated to a selected temperature dependent upon the fuel and oxidant used, for example, when using natural gas and air, generally the air is preheated to about 1160° F. Preheating may be achieved by any suitable method, such as thermal exchange with solids discharged from the process itself or by injection of steam. The fuel and the oxidant gas mix in the primary mixing chamber and the mixing orifice prevents flashback to the primary mixing chamber. This is due to the velocity through the mixing orifice being, preferably, about 3 to about 8 times the velocity in the primary mixing chamber.

The discrete flame in the fluidized bed according to the apparatus and process of this invention provides formation of two temperature zones within a single fluidized bed improving the overall thermal efficiency and economics of many processes such as incineration of wastes, calcining of sand, roasting of ores, sintering of ores, concentration of ores, and the like, processes depending upon thermal treatment forming a heavier weight particle fraction of the solids in the fluidized bed. Typically, the temperature in the higher temperature zone in and surrounding the flame is about 1300° to about 1500° F. while the temperature in the lower temperature zone encompassing the remainder of the fluidized bed is about 800° to about 1100° F., dependent upon solids residence time in the fluidized bed and dependent upon the presence of inert heat transfer solids which may be added to the fluidized bed for enhanced heat transfer from the higher to the lower temperature zones of the fluidized bed. Feed solids to the fluidized bed may include any solids of particle size and nature which will maintain a fluidized bed and which with thermal and/or reactant gas treatment form a lighter weight gas and/or vapor and/or particle fraction and a heavier weight particle fraction, relative to the average bed contents.

One process which is especially suited for the apparatus and process of the present invention is the sintering of fine particles of natural or concentrated iron ores for use as blast furnace feed for the production of iron and steel. It is most desirable to feed a blast furnace particles of a size of about 6 to 25 mm in diameter. Prior art sintering processes have achieved such sintering by depositing a mixture of iron ore, such as siderite (FeCO$_3$) fines and coke fines on a traveling grate. The traveling grate is shaped similar to a conveyor belt forming a shallow trough with small holes in the bottom. The bed of materials on the grate is ignited by passing under an ignition burner that is fired with natural gas and air, and then as the grate moves slowly toward the discharge end, air is pulled down through the bed and as the coke fines burn in the bed, the siderite decomposes at about 800° F. to form iron oxide. As more coke burns, the heat generated increases the temperature of the entire mass to a temperature sufficient to sinter the iron oxide particles which are discharged and then crushed, cooled and screened to achieve the desired uniform feed size for the blast furnace. Fines produced in the process must be recycled. The process of the present invention integrates the decomposition of siderite to iron oxide and the production of controlled size agglomerates. According to the present invention, iron ore fine particles may be fed directly to the lower temperature zone of a fluidized bed operated at a sufficiently high temperature (approximately 800° F.) to convert the siderite to iron oxide. The higher temperature region in and surrounding the flame is operated at a temperature sufficiently high (approximately 1300° F.) to promote agglomeration of iron oxide formed in the lower temperature volume of the fluidized bed, the high velocity jetting action of the upward flowing solids discharge gas facilitating smoothening of the agglomerates. The size control of agglomerates discharged from the bottom of the bed is adjusted by the discharge gas velocity. The process of this invention in its application to production of blast furnace feed provides high process efficiency with continuous discharge of agglomerates ready for use as blast furnace feed.

Another application of the process of this invention is the concentration of lower melting materials, such as copper, from higher melting impurities, such as sand or other oxides. For example, copper ore such as chalcopyrite comprising a mixture of sulfides of copper, copper-iron and iron with gangue minerals, may be added directly to the lower temperature zone of a fluidized bed, the oxidant in the fluidizing gases removing sulfur by oxidation to sulfur dioxide. Iron would combine with silica, either from the gangue or added flux, in the higher temperature flame region of the fluidized bed and would be discharged as heavier weight agglomerates, while low sulfur, copper-rich material would be removed as lighter solids through lighter solids outlet 20 for copper refining processes.

In applications of the process of this invention for incinerating municipal solids waste, the solids waste material with no separation, may be added to the fluidized bed where in the lower temperature portion, the combustible portions of the municipal solids waste will burn, and the higher temperature region and the discrete flame will provide agglomeration and discharge of non-organic components of the municipal solids waste.

In yet another application of the process of this invention, improved calcining may be achieved by virtue of the higher temperature region of the fluidized bed in the zone of the discrete flame. For example, the apparatus and process of this invention has been used to burn off organic materials from used foundry sand to provide reusable clean foundry sands. The passage of contaminated solids through the higher temperature zone surrounding the discrete flame and multiple passages through the flame itself provides rapid, thermally efficient separation of the organic materials by their gasification and removal through conduit 21. The sand being discharged is caused to undergo multiple passes through the higher temperature zone by the upward jetting action of solids discharge gas flowing upwardly through heavier solids discharge conduit 15 thereby assuring sand being discharged free from organic contaminants.

The process and apparatus of this invention, directly contrary to prior art fluidized beds, provide two temperature regions in a single fluidized bed. The apparatus and process of this invention by adjustment of the fluidizing gas jets may promote inward flow and recirculation of bed solids into and through the discrete flame enhancing rapid solids heating and providing additional fuel/oxidant mixing and enhancement of good combustion while the upward action of the solids discharge gas enhances multiple passage of the solids through the higher temperature region prior to discharge.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A process for thermal treatment of solid particles in a fluidized bed, said solid particles characterized by thermal treatment forming a lighter weight fraction and a heavier weight fraction, relative to the total contents of the bed, said process comprising:

feeding solid particles to a fluidized bed of solid particles, said fluidized bed supported on a bed support having at least one region of opposing downwardly sloping portions converging in thier lower portions into an opening of a density/size particle classification heavier particle discharge conduit, said heavier particle discharge conduit having a necked region;

maintaining said fluidized bed of solid particles in fluidized condition by pressurized fluidizing gas entering said bed through a plurality of nozzle means in said bed support and pressurized solids discharge gas entering through said heavier particle discharge conduit controlling heavier particle passage therethrough;

maintaining a discrete fluid fueled flame in said fluidzied bed in close proximity to and above said opening of said heavier particle discharge conduit by feeding fuel and oxidant through a burner extending upwardly through the central portion of said heavier particle discharge conduit and having an outlet above said opening forming a higher temperature zone in and surrounding said flame, said higher temperature one at least about 100° F. higher than the remainder bed temperature;

circulating said solid particles in said fluidized bed through said higher temperature zone heating said particles to form said heavier weight particle fraction;

maintaining flow velocity of said solids discharge gas upwardly through an annular passage between said burner and said necked region of said heavier particle discharge conduit sufficiently high to permit downward passage of said heavier wieght particles for discharge while restraining from downward passage substantially all said ligher weight fraction and recirculating said lighter weight fraction through said higher temperature zone, and withdrawing said heavier weight particles through said heavier particle discharge conduit; and withdrawing said lighter weight fraction from the upper region of said bed.

2. The process of claim 1 wherein said lighter weight fraction comprises solid particles which are withdrawn from an upper region of said fluidized bed.

3. The process of claim 1 wherein said lighter weight fraction comprises gas which is withdrawn from above the top surface of said fluidized bed.

4. The process of claim 1 wherein said higher temperature zone is about 100° to about 400° F. higher than said remainder bed temperature.

5. The process of claim 1 wherein said higher temperature zone is about 200° to about 300° F. higher than said remainder bed temperature.

6. The process of claim 1 wherein said bed support sloping portions have about 15° to about 75° angle to the horizontal and at least a portion of said nozzle means in said bed support are directed toward said flame.

7. The process of claim 6 wherein said mixed fuel and oxidant is passed through a mixing orifice increasing its velocity by at least about three times to about 100 to about 500 feet per second and discharging said mixed fuel and oxidant to said flame at a velocity of about 50 to about 200 feet per second.

8. The process of claim 1 wherein said fluid fuel is supplied to a burner primary mixing chamber at a velocity of about 100 to about 700 feet per second and oxidant is supplied annularly to said primary mixing chamber at a velocity of about 20 to about 150 feet per second, provided said fuel velocity is at least about five times said oxidant velocity providing mixing of said fuel and oxidant.

9. The process of claim 1 wherein said pressurized gas is admitted through said heavier particle discharge conduit at a velocity of about 15 to about 60 feet per second and through said nozzle means in said bed support at a velocity of about 30 to about 100 feet per second providing an average fluidizing velocity of about 1 to about 10 feet per second.

10. The process of claim 1 wherein said fluid fuel is supplied to a burner primary mixing chamber at a velocity of about 100 to about 700 feet per second and oxidant is supplied annularly to said primary mixing chamber at a velocity of about 20 to about 150 feet per second, provided said fuel velocity is at least twice said oxidant velocity providing mixing of said fuel and oxidant and said mixed fuel and oxidant is passed through a mixing orifice increasing its velocity to about 100 to about 500 feet per second and discharging said mixed fuel and oxidant to said flame at a velocity of about 50 to about 200 feet per second.

11. The process of claim 10 wherein said thermal treatment comprises calcining.

12. The process of claim 10 wherein said thermal treatment comprises agglomeration.

13. The process of claim 10 wherein said thermal treatment comprises oxidation.

14. The process of claim 10 wherein said solid particles are non-combustible.

15. The process of claim 1 wherein said solid particles are non-combustible.

* * * * *